United States Patent
Brouwer (10) Patent No.: US 9,975,489 B2
(45) Date of Patent: May 22, 2018

(54) WING MIRROR UNIT, DRIVE CONSTRUCTION, AND ROTATION SENSOR

(71) Applicant: MCi (Mirror Controls International) Netherlands B.V., Woerden (NL)

(72) Inventor: Stefan Frits Brouwer, Woerden (NL)

(73) Assignee: MCi (Mirror Controls International) Netherlands B.V., Woerden (NL)

( * ) Notice: Subject to any disclaimer, the term of this patent is extended or adjusted under 35 U.S.C. 154(b) by 0 days. days.

(21) Appl. No.: 15/304,913

(22) PCT Filed: May 13, 2015

(86) PCT No.: PCT/NL2015/050340
§ 371 (c)(1),
(2) Date: Oct. 18, 2016

(87) PCT Pub. No.: WO2015/174839
PCT Pub. Date: Nov. 19, 2015

(65) Prior Publication Data
US 2017/0136950 A1    May 18, 2017

(30) Foreign Application Priority Data

May 13, 2014    (NL) ...................................... 2012808

(51) Int. Cl.
*G02B 7/18*     (2006.01)
*B60R 1/074*    (2006.01)
*B60R 1/072*    (2006.01)

(52) U.S. Cl.
CPC ............. *B60R 1/074* (2013.01); *B60R 1/072* (2013.01); *B60Y 2400/301* (2013.01); *B60Y 2400/41* (2013.01)

(58) Field of Classification Search
CPC ......... B60R 1/074; B60R 1/072; B60R 1/078; B60Y 2400/41; B60Y 2400/301; G02B 7/18
(Continued)

(56) References Cited

U.S. PATENT DOCUMENTS

2003/0002180 A1* 1/2003 Nielsen .................. B60R 1/008
                                                        359/877
2003/0218812 A1* 11/2003 Foote ..................... B60R 1/074
                                                        359/874

FOREIGN PATENT DOCUMENTS

| EP | 0838371 A1 | 4/1998 |
| JP | 2000 264131 | 9/2000 |
| WO | WO 00/47445 | 8/2000 |

OTHER PUBLICATIONS

International Search Report from PCT/NL2015/050340 dated Aug. 25, 2015.

* cited by examiner

*Primary Examiner* — Euncha Cherry
(74) *Attorney, Agent, or Firm* — Swanson & Bratschun, L.L.C.

(57) ABSTRACT

Wing mirror unit, drive construction, and rotation sensor The invention relates to a wing mirror unit (1) for a motor vehicle. The unit comprises a mirror housing support (3) for attachment to a body (4) of the motor vehicle (2). The wing mirror unit further comprises a mirror housing (5) supported by the mirror housing support and pivotably arranged with respect to said support around a rotation axis (6) extending substantially in an upward direction. Furthermore, the unit comprises a drive, preferably an electric drive, for pivoting the mirror housing between a folded-out position of the mirror housing, in which the mirror housing extends substantially in a direction (7) away from the body of the motor (Continued)

vehicle, and a folded-in position of the mirror housing, in which the mirror housing projects less far and extends in a substantially rearward direction more alongside the body of the motor vehicle, and/or for pivoting the mirror housing between the folded-in position and the folded-out position. The wing mirror unit also comprises a rotation sensor (8), preferably a potentiometer, having a sensor axis (9). Said unit is arranged for rotating the sensor axis during a limited part of the pivoting route between the folded-out position and the folded-in position and/or during a limited part of the pivoting route between the folded-in position and the folded-out position.

17 Claims, 7 Drawing Sheets

(58) Field of Classification Search
USPC .................................................. 359/874, 877
See application file for complete search history.

WING MIRROR UNIT, DRIVE CONSTRUCTION, AND ROTATION SENSOR

RELATED APPLICATIONS

This application is a 35 U.S.C. § 371 national phase application of PCT/NL2015/050340 (WO 2015/174839), filed on May 13, 2015, entitled "Wing Mirror Unit, Drive Construction, and Rotation Sensor", which application claims priority to Netherlands Application No. 2012808, filed May 13, 2014, which is incorporated herein by reference in its entirety.

The invention relates to a wing mirror unit for a motor vehicle, comprising a mirror housing support for attachment to a body of the motor vehicle, a mirror housing supported by said support and pivotably arranged around a rotation axis extending substantially in an upward direction, and a drive, preferably an electric drive, for pivoting the mirror housing between a folded-out position of the mirror housing, in which the mirror housing extends substantially in a direction away from the body of the motor vehicle, and a folded-in position of the mirror housing, in which the mirror housing projects less far and extends in a substantially rearward direction more alongside the body of the motor vehicle.

For example, in the folded-in position, an angle between a mirror housing and a longitudinal direction of the vehicle can be between −10° and +20°, especially about 0° or about 10°, seen in a direction substantially from above, whereas, in the folded-out position, the angle between the mirror housing and said longitudinal direction of the vehicle can for instance be between +45° and +100°, especially about 50° or about 60°, seen in a direction substantially from above.

Such a wing mirror unit is generally known. Usually, the wing mirror unit comprises cooperating stop surfaces limiting how far the mirror housing can be folded-out. For example, a first stop surface is associated with the mirror housing and a second stop surface is associated with the mirror housing support. Normally, the wing mirror unit is arranged such that, when the mirror housing reaches its maximum folded-out position, the electric drive is cut off by means of a cut-off circuit based on a current strength limitation when the cooperating stop surfaces abut. It is noted that the mirror housing may then for instance be held in said folded-out position, e.g. by means of a spring, especially a spring biasing the stop surfaces towards each other in said maximum folded-out position.

Further, the known wing mirror unit generally comprises a mirror glass held by a mirror glass holder provided in the mirror housing. It is noted that an angular position of the mirror glass holder may be adjustable in order to facilitate meeting personal preferences of a user, e.g. in order to fit a distance between a driver and a driving controls, which distance may change when repositioning a driver's seat. Therefore, the mirror glass holder can be pivotably arranged around a second substantially upwardly extending rotation axis. Hence, in the folded-out position of the mirror housing, an angle between the mirror glass and the vehicle body can be adjusted or fine-tuned, wherein said angle is seen in a direction substantially from above, i.e. said angle can lie in a substantially horizontal plane. Usually, the wing mirror unit may then also comprise a drive train including a second electric drive for pivoting the mirror glass holder between different angular fine-tune positions, which fine-tune positions may for instance range from −12° to +12° with respect to a medium position or neutral position of the mirror glass holder in the folded-out position of the mirror housing.

Generally, one of the elements of said drive train can be coupled with a sensor axis of a rotation sensor, preferably a potentiometer. Since the ratio between the angle of the measured rotation of the sensor axis and the pivoting angle of the mirror glass holder is known, the rotation sensor can provide feedback regarding the angular fine-tune position of the mirror glass holder. Said feedback may for instance be used when the wing mirror unit and/or the vehicle is provided with a memory for saving one or more preferred angular positions of the mirror glass and is for instance also arranged for putting the mirror glass holder and the mirror glass at least partly automatically back into such a saved angular position of the mirror glass (holder).

In this context, is noted that the feedback of a rotation sensor can normally be relatively accurate when a sensor axis thereof is rotated over a relatively large part of its maximum rotation. For example, the feedback of a potentiometer can be relatively accurate when a relatively large part of path, along which a sliding contact or so-called wiper of a potentiometer can move along a resistive element of said potentiometer, is used to measure a certain angular rotation, e.g. a rotation of a mirror glass holder. It is further noted that a resistive element of a potentiometer often extends over more than 50%, especially more than 75% of a perimeter of a potentiometer, e.g. over between about 250° and about 350°, e.g. over about 300°. When the sliding contact of the potentiometer can for example move along substantially the full length of such a path, e.g. a substantially 300° path, while the mirror glass holder can be adjusted over about 25°, e.g. in a range from −12.5° to +12.5° with respect to the neutral position of the mirror glass holder, an angular rotation of the sensor axis of about 300° can correspond with an angular rotation of the mirror glass holder of about 25°. In such case, an angular rotation of the sensor axis of 12° can thus correspond with an angular rotation of the mirror glass holder of 1°. However, in a case that the rotation of the axis of potentiometer corresponds to the rotation of the mirror glass holder in a one to one ratio, an angular rotation of the sensor axis of only 1° corresponds with an angular rotation of the mirror glass holder of 1°. The relative accuracy of measurement of a potentiometer can thus be higher when the potentiometer is rotated along a relatively large part of the length of its resistive element.

A disadvantage of such known wing mirror units for wing mirror units is that at least two drives are needed, a first one for moving the mirror housing and the mirror glass provided therein from a folded-in position to a folded-out position and a second one to fine-tune the mirror glass held by a pivotable mirror glass holder. Two drives for pivoting around a substantially upwardly extending rotation axis may for instance make the wing mirror unit more complex and/or error-prone, may be more expensive than a single drive, may take up more space, and/or may be more difficult to be controlled. For example, it may be difficult and/or undesirable to provide relatively much space for disposing cables when also a second drive for pivoting the mirror glass holder has to be provided, when said second drive is provided within the mirror housing.

The inventor of the present invention contemplated to provide a wing mirror unit, wherein the second drive for adjusting the mirror glass holder could be omitted. In such a contemplated wing mirror unit, the first drive could then for instance not only be used for bringing the mirror housing from a folded-in position into a folded-out position, but could also be used to fine-tune the angular position of the mirror housing between different folded-out positions, thereby thus fine-tuning the angular position of a mirror glass housed in said housing. Since an angle between a mirror glass in a folded-in position and a mirror glass in a neutral position of a folded-out mirror housing can for instance be about 60°, and since it should then for instance be able to fine-tune the angle of the folded-out mirror housing in a range of e.g. −12° to +12° with respect to said neutral position, the drive should for example be able to pivot the mirror housing from 0° (corresponding to a folded-in position) to 72° (60° plus 12°, i.e. a neutral folded-out position plus a maximum fine-tune pivoting away form the folded-in position). Since standard rotation sensors, such as standard potentiometers, are relatively cheap, it is desirable to use such a rotation sensor, e.g. a standard potentiometer, for measuring the angular position of the mirror housing of such a contemplated wing mirror unit. However, when a standard rotation sensor, e.g. a standard potentiometer, is to be used for following a rotation of the mirror housing over for instance at least about 72°, the axis of a standard rotation sensor that for instance may measure over about 300° can only rotate about 4° for any 1° of rotation of the mirror housing, whereas the axis of the same rotation sensor can rotate about 12° for any 1° of rotation of the mirror glass holder when two separate drives are used such as in the above described known situation. Hence, when a standard rotation sensor, such as a standard potentiometer, would be used to follow the rotation of the mirror housing between the folded-in position and the maximum folded-out position of said mirror housing (e.g. over about 72° of rotation), the accuracy of the measurement of the rotation of the mirror housing (and thus the mirror glass held thereby) would be relatively poor.

It is an object of the invention to provide an alternative wing mirror unit. In particular, the invention aims at providing a wing mirror unit, wherein at least one of the disadvantages of one or more prior art wing mirror units is counteracted. More in particular, the invention may aim to provide a wing mirror unit, wherein at least one of the disadvantages mentioned above is counteracted. In embodiments, the invention aims at providing a wing mirror unit comprising a drive for pivoting a mirror housing between a folded-in position and a folded-out position and/or vice versa, wherein fine-tuning of the mirror glass can at least partly be done by means of said same drive, preferably wherein a rotation sensor, especially a standard potentiometer, can be used to perform a relative accurate measurement of the angular rotation of the mirror glass and/or mirror housing when being fine-tuned.

Thereto, in embodiments, the invention provides for a wing mirror unit for a motor vehicle, comprising: a mirror housing support for attachment to a body of the motor vehicle; a mirror housing supported by the mirror housing support and pivotably arranged with respect to said support around a rotation axis extending substantially in an upward direction; and a drive, preferably an electric drive, for pivoting the mirror housing between a folded-out position of the mirror housing, in which the mirror housing extends substantially in a direction away from the body of the motor vehicle, and a folded-in position of the mirror housing, in which the mirror housing projects less far and extends in a substantially rearward direction more alongside the body of the motor vehicle, and/or for pivoting the mirror housing between the folded-in position and the folded-out position, wherein the wing mirror unit further comprises a rotation sensor, preferably a potentiometer, having a sensor axis, and wherein the wing mirror unit is arranged for rotating the sensor axis during a limited part of the pivoting route between the folded-out position and the folded-in position and/or during a limited part of the pivoting route between the folded-in position and the folded-out position.

For example, when the mirror housing is pivoted from 0°, i.e. a folded-in position, towards a minimum folded-out position, e.g. 48° (60° minus 12°, e.g. a neutral folded-out position minus a maximum fine-tune pivoting towards the folded-in position), the sensor axis may be kept substantially stationary, e.g. may not be rotated then. It is noted that the sensor may thus not be able to measure the angular position of the mirror housing when it is pivoted within said range from the folded-in position to the minimum folded-out position. However, the wing mirror unit is thus arranged such that it can rotate the sensor axis when the mirror housing is fine-tuned, i.e. when the mirror housing is pivoted between different folded-out positions, e.g. when being pivoted from its minimum folded-out position (e.g. 48°) towards it maximum folded-out position, e.g. 72° (60° plus 12°, i.e. a neutral folded-out position plus a maximum fine-tune pivoting in a direction away from the folded-in position).

By arranging the wing mirror unit such that it drives rotation of the sensor axis during a limited part of the pivoting route between the folded-in position and the folded-out position, it is made possible to rotate the sensor axis only or mainly during fine-tuning of the mirror housing. As a result, a relatively small part (e.g. 48° to 72°) of an angular rotation of the mirror housing rotating between its folded-in position and its maximum folded-out position (e.g. 0° to 72°) may correspond with a relatively large angular rotation (e.g. 0° to 300°) of the sensor axis. Consequently, the axis of the sensor may for instance rotate a relatively many degrees for any 1° of rotation of the mirror housing within the fine-tuning route. For example, the axis of the sensor may for instance rotate about 12° for any 1° of rotation of the mirror housing within the fine-tuning route (e.g. from 48° to 72°, i.e. from 60° minus 12° towards 60° plus 12°). Therefore, in embodiments, the invention can provide for a wing mirror unit comprising a drive for pivoting a mirror housing between a folded-in position and a folded-out position and/or vice versa, wherein the fine-tuning of the mirror glass can at least partly be done by means of the same drive, wherein a rotation sensor, especially a standard potentiometer, can be used to perform a relative accurate measurement of the angular rotation of the mirror glass and/or the mirror housing when being fine-tuned between different folded-out positions.

The invention also relates to a drive construction for driving a sensor axis of a rotation sensor of a wing mirror unit. Further, the invention relates to a rotation sensor.

Advantageous embodiments according to the invention are described in the appended claims.

By way of non-limiting examples only, embodiments of the present invention will now be described with reference to the accompanying figures in which.

It is noted that the figures show merely preferred embodiments according to the invention. In the figures, the same or similar reference signs or numbers refer to equal or corresponding parts.

FIGS. 1a-1d show a wing mirror unit 1 for a motor vehicle 2 in four different positions. The wing mirror unit 1 comprises a mirror housing support 3 for attachment to a body 4 of the motor vehicle 2, such as for instance a car, van, bus, coach, motorcycle, tractor or truck. For example, said support 3 can be attached to the vehicle body 4, e.g. on the side of the vehicle, for instance on a door of the vehicle. Advantageously, a vehicle 2 can be provided with at least two wing mirror units 1, one provided on the left side and one provided at the right side. Although the wing mirror unit 1 is a right side wing mirror unit in the embodiment shown here in FIGS. 1a-1d, it is apparent that the wing mirror unit 1 can in alternative embodiments be a left side wing mirror unit.

It is noted that the wing mirror unit 1 comprises a mirror housing 5. The mirror housing 5 is supported by the mirror housing support 3. The mirror housing is pivotably arranged with respect to the mirror housing support 3 around a rotation axis 6 extending substantially in an upward direction, preferably substantially transverse to the horizontal plane. In embodiments, said rotation axis 6 extending substantially in an upward direction may be tilted to some extent with respect to the horizontal plane, e.g. even when the vehicle is in an upright position.

Figure 1A:
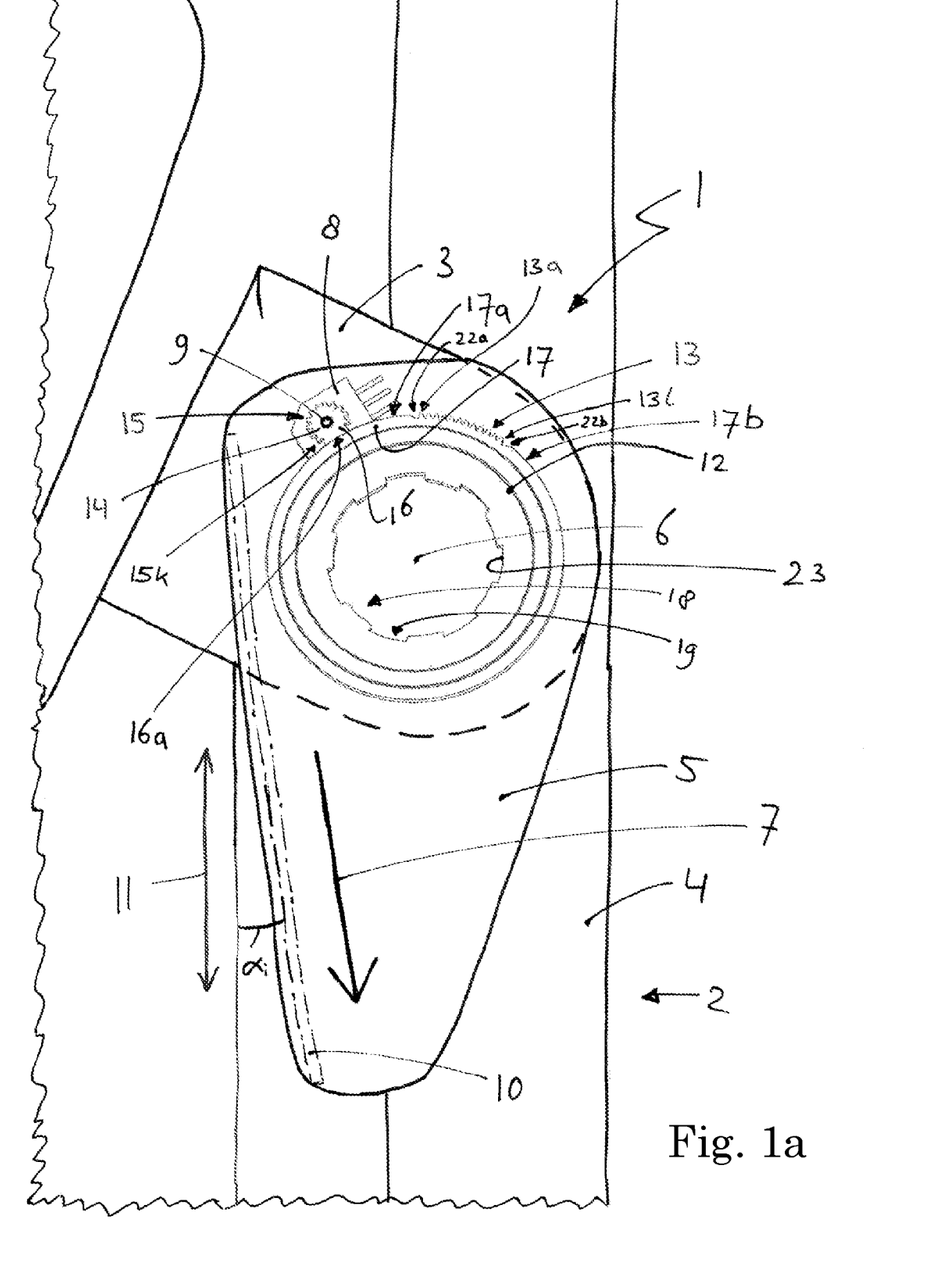
FIG. 1a shows a schematic partly cutaway top view of a vehicle provided with an exemplary embodiment of a wing mirror unit according to an aspect of the invention in a first position corresponding to a folded-in position of a mirror housing of said wing mirror unit.
Figure 1B:
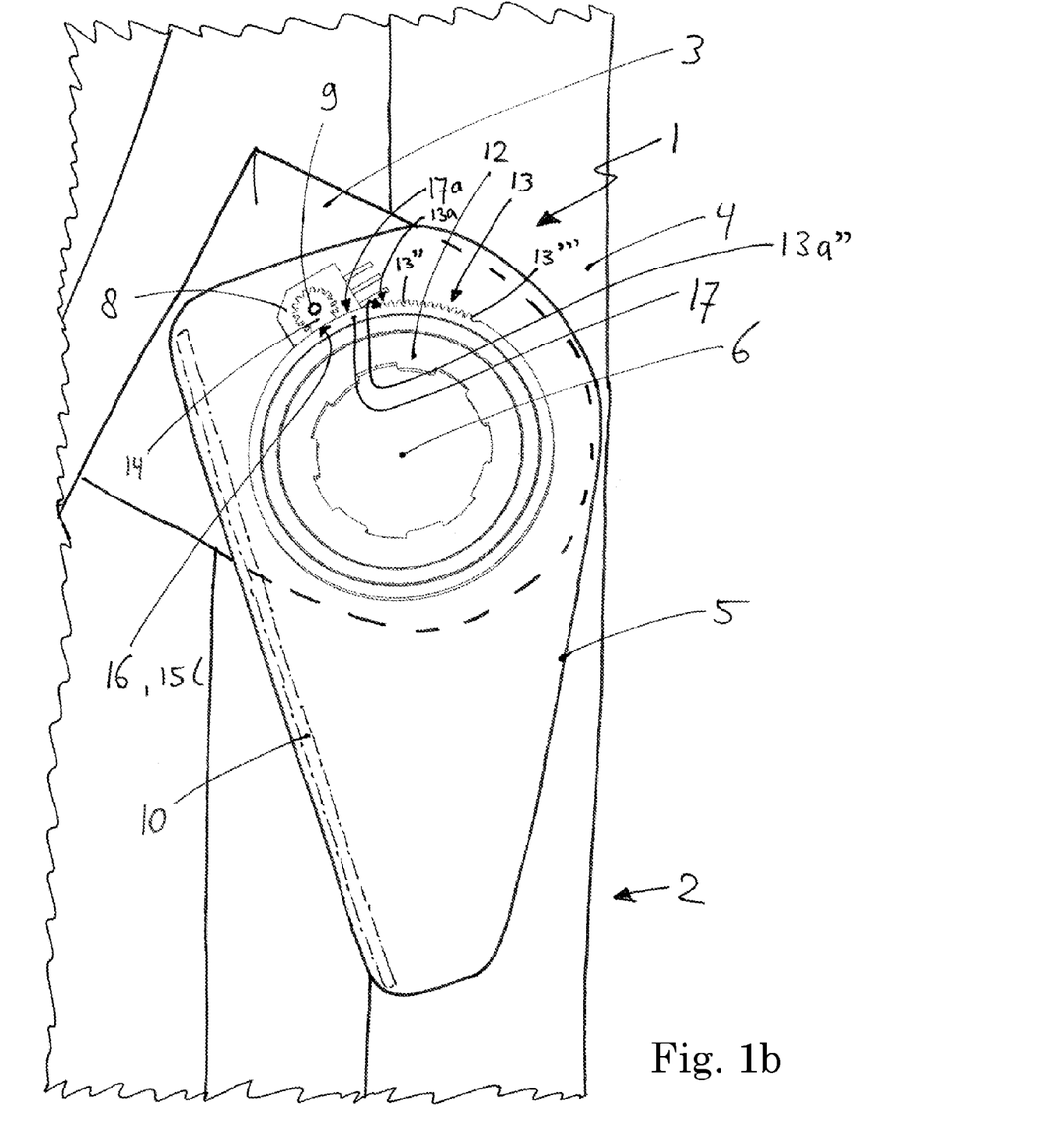
FIG. 1b shows a schematic partly cutaway top view of the vehicle of FIG. 1a with the wing mirror unit in a second position.
Figure 1C:
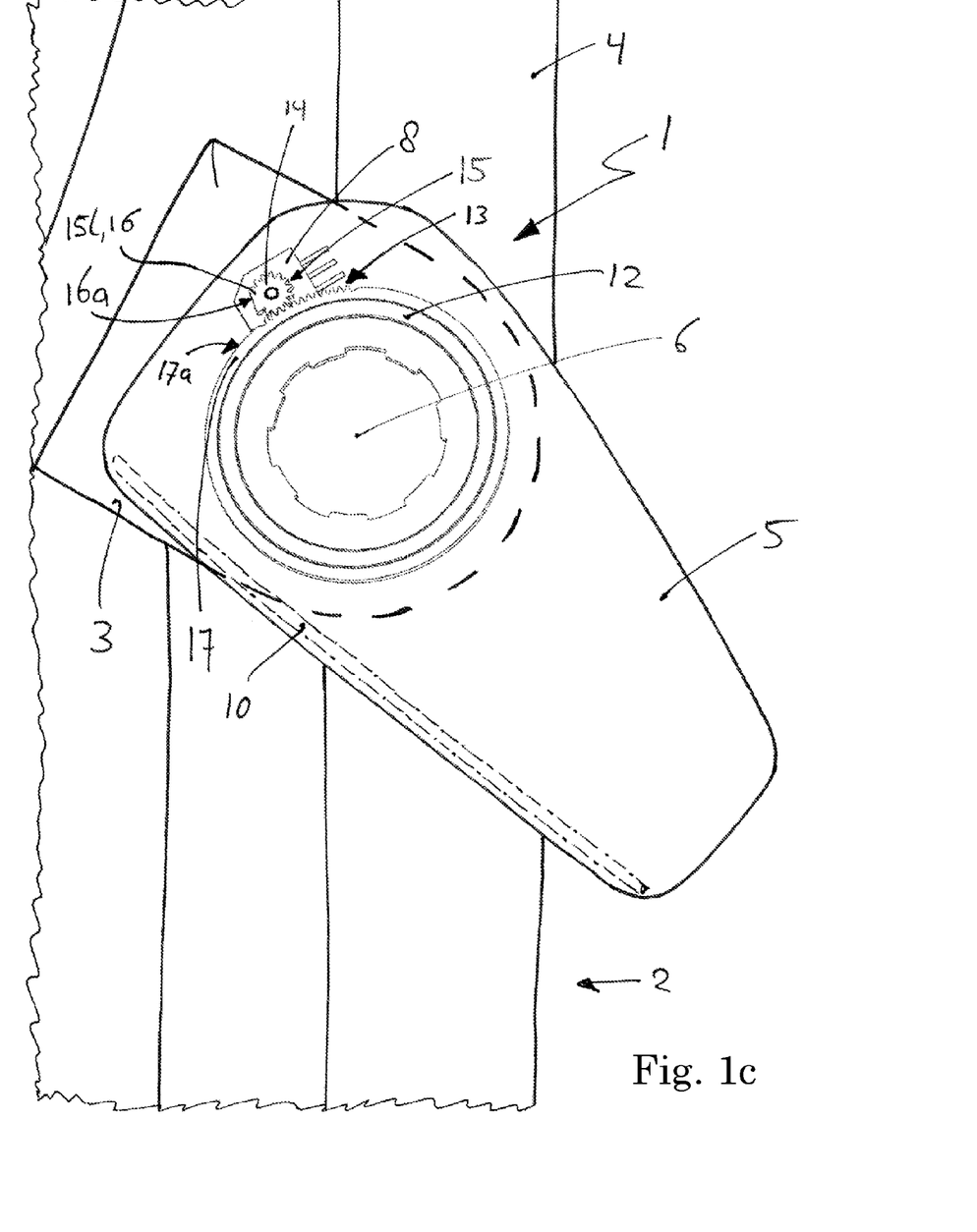
FIG. 1c shows a schematic partly cutaway top view of the vehicle of FIGS. 1a and 1b with the wing mirror unit in a third position.
Figure 1D:
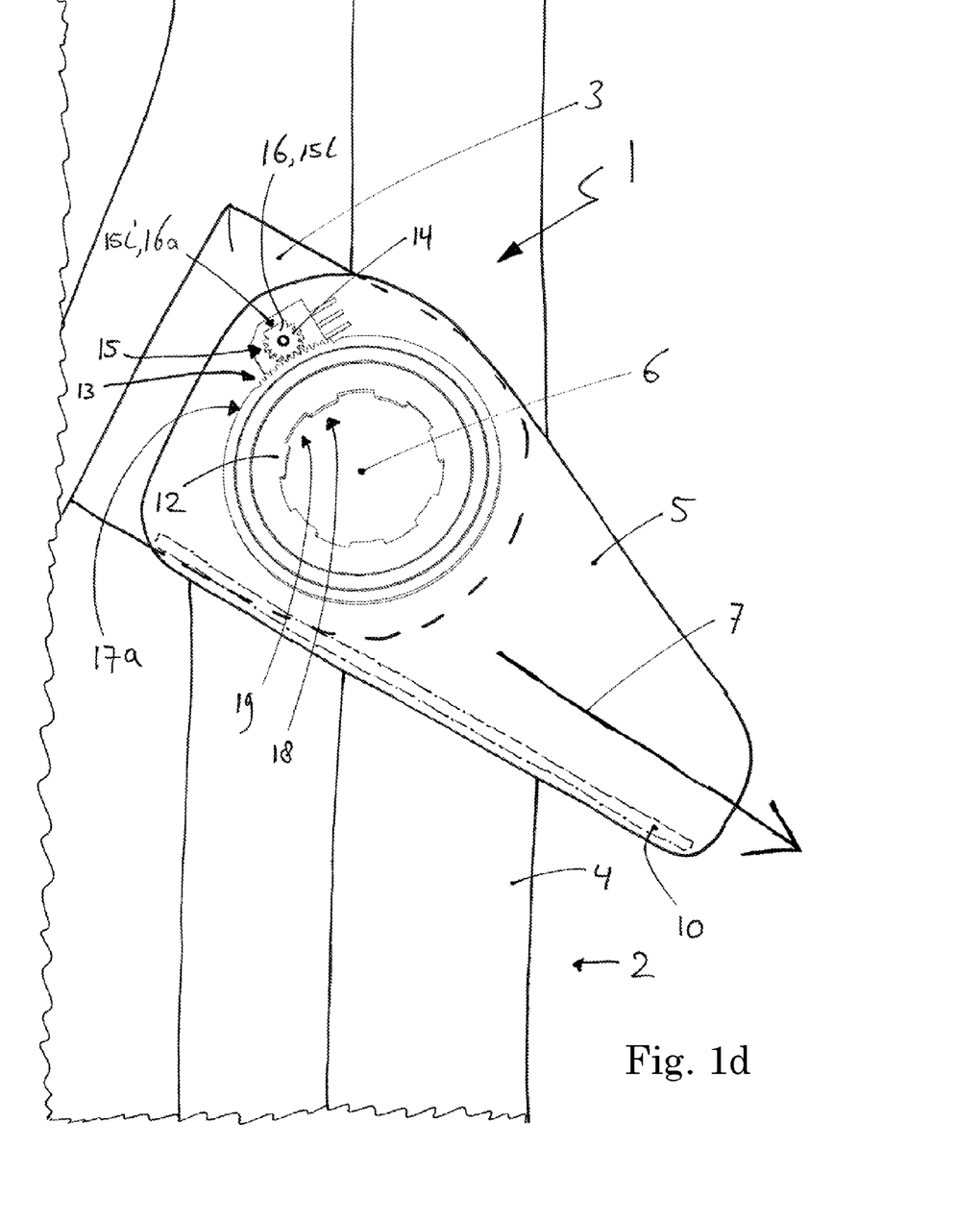
FIG. 1d shows a schematic partly cutaway top view of the vehicle of FIGS. 1a-1c with the wing mirror unit in a fourth position.

Further, the wing mirror unit 1 comprises a drive for pivoting the mirror housing 3 between a folded-out position of the mirror housing, in which the mirror housing 5 extends substantially in a direction 7 away from the body 4 of the motor vehicle 2, such as for instance can be seen in FIG. 1c and FIG. 1d, and a folded-in position of the mirror housing 5, such as for instance can be seen in FIG. 1a. It is noted that the mirror housing 5 extending substantially in a direction 7 away from the vehicle body 4 could at least be understood as a direction of the mirror housing 5 in which a mirror glass 10 held by and/or in said mirror housing 5 is extending in a direction substantially away from the vehicle body 4, and/or projecting and/or extending at least further away than in the folded-in position. Additionally or alternatively, the drive may be for pivoting the mirror housing 5 between a folded-in position and a folded-out position. Advantageously, the drive can be for pivoting the mirror housing 5 both from a folded-in position to a folded-out position and vice versa. Moreover, in embodiments, said drive may be used for moving the mirror housing 5 and/or the mirror glass 10 held by said housing 5 from one folded-out position to another folded-out position.

In the folded-in position of the mirror housing 5, the mirror housing 5 projects less far and extends in a substantially rearward direction 8 more alongside the body 4 of the motor vehicle 2, such as for instance can be seen in FIG. 1a. It is noted that the substantially rearward direction 8 in which the mirror housing can extend could at least be understood as a direction of the mirror housing 5 in which the mirror glass 10 held by and/or in the mirror housing 5 extends substantially in a rearward direction. In the exemplary embodiment of FIG. 1a, an angle $\alpha_i$ between the substantially rearward direction 8 of the mirror housing and a longitudinal direction of the vehicle and/or a direction 11 along which a side of the vehicle extends is about +7°. However, in other embodiments, said angle $\alpha_i$ corresponding with the folded-in position of the mirror housing 5 can for instance be between −10° and +25°, preferably between 0° and 15°.

Preferably, the drive can comprise an actuator, such as for instance an electric motor. For example, the drive can be an electric drive. In embodiments, an output axis of the electric motor can be coupled, directly or indirectly, to the mirror housing 5, whereas a housing of the electric motor can be substantially fixed, at least against rotation, within the mirror housing support 3. Alternatively, the motor housing can be substantially fixed, at least against rotation, within the mirror housing 5, whereas the output axis of the motor can be connected, directly or indirectly, to the mirror housing support 3.

It is noted that the output axis of the electric motor may be in line with, may be, and/or may form the rotation axis 6 of the wing mirror unit 1.

In embodiments, the wing mirror unit 1 may be provided with a stop or so-called stop means, for instance comprising a first stop surface provided at and/or associated with the mirror housing support 3 and a second stop surface provided at and/or associated with the mirror housing 5, such that the mirror housing 5 can be stopped in a certain predetermined position when being folded-in, e.g. in its folded-in position. It is noted that whereas the mirror housing may be arranged to be held in one of its multiple possible folded-out positions, the mirror housing may thus be arranged to be brought only in substantially a single folded-in position. It is further noted that the drive, e.g. an electric drive, can in embodiments be cut off by means of a cut-off circuit based on a current strength limitation when the cooperating stop surfaces abut. Additionally or alternatively, the wing mirror unit 1 may comprise a biasing means, e.g. a spring or spring means, for keeping the wing mirror housing 5 substantially in its folded-in position.

Furthermore, the wing mirror unit 1 comprises a rotation sensor 8. The rotation sensor 8 has a sensor axis 9. Preferably, the rotation sensor 8 can be a potentiometer or so-called pot. However, in alternative embodiments the rotation sensor 8 can be or comprise another sensor. For example, the rotation sensor 8 can be a Hall effect sensor or the rotation sensor 8 may comprise a pressure sensor or a strain gauge, which for example may cooperate with a spiral torsion spring in order to sense a rotation.

Furthermore, the wing mirror unit 1 is arranged for rotating the sensor axis 9 during a limited part of the pivoting route between the folded-out position and the folded-in position and/or during a limited part of the pivoting route between the folded-in position and the folded-out position.

In the exemplary embodiment shown in FIGS. 1a-1d, the rotation sensor 8 is fixed at or in the mirror housing 5 at least rotationally with respect to the rotation axis 6. As a result, in such embodiment, the sensor 8 may pivot along with the mirror housing 5 around the rotation axis 6 of the wing mirror unit 1 between the folded-in position and the folded-out position of the mirror housing 5 and/or between the folded-out position and the folded-in position. The wing mirror unit 1 may further comprise a sensor driving element 12 or so-called driving element for driving the sensor axis 9. For example, said driving element 12 can comprise and/or can be formed by a specially arranged gear wheel or so-called cogwheel. Advantageously, said driving element 12 can be at least rotationally fixed at or in the mirror housing 5 with respect to the rotation axis 6. For example, the sensor driving element 12 can be provided at or near a top surface of the mirror housing support 5. In embodiments, the driving element 12 can be rotationally fixed with respect to a shaft of the mirror unit 1, e.g. by means of protrusions 18 and/or indentations 19, e.g. provided at an inside perimeter 23 of the driving element 12, for cooperation with corresponding indentations and/or protrusions provided at an outside perimeter of the shaft. For example, said shaft can rotationally fixed at or on the mirror support 3 and/or may at least partly extend into a cavity in the mirror housing 5, wherein the mirror housing 5 may be arranged such that it can pivot around said shaft. The driving element 12 may then thus be associated with and/or attached to the mirror housing support 3 and/or a shaft thereof, but may be located substantially within the mirror housing 5. It is noted that the wing mirror unit 1 can be arranged such that the sensor driving element 12 rotates the sensor axis 9 during a limited part of the pivoting movement of the sensor 8 pivoting along with the mirror housing 5 between the folded-in position and the folded-out position and/or between the folded-out position and the folded-in position.

However, in alternative embodiments, the wing mirror unit 1 can be arranged differently. For example, the rotation sensor 8 can be at least rotationally fixed with respect to the rotation axis 6, i.e. fixed against rotation with respect to the rotation axis 6, at or in the mirror housing support 3, e.g. such that said sensor 8 can substantially not pivot along with the mirror housing 5 when the mirror housing 5 pivots around the rotation axis 6 of the wing mirror unit 1. The wing mirror unit 1 can further comprise a sensor driving element 12 or so-called driving element 12 for driving the sensor axis 9. Said driving element 12, which advantageously can be similar to the one described above, may be arranged such that it pivots along with the mirror housing 5 between the folded-in position and the folded-out position of said mirror housing 5 and/or along with rotation in the opposite direction. Advantageously, the sensor driving element 12 is coupled and/or attached to the mirror housing 5, e.g. at or near an underside of the mirror housing 5, and/or is integrally formed as a part of the mirror housing 5. In embodiments, the driving element 12 can be rotationally fixed with respect to a shaft of the mirror unit 1, e.g. by means of protrusions 18 and/or indentations 19, e.g. provided at an inside perimeter 23 of the driving element 12, for cooperation with corresponding indentations and/or protrusions provided at an outside perimeter of the shaft. For example, said shaft can be coupled to an output axis of an electric motor of the drive and/or can be rotationally fixed with respect to the wing mirror housing 5. It is noted that, additionally or alternatively, said shaft may then at least partly extend into a cavity in the mirror housing support 3. The driving element 12 may then thus be associated with and/or attached to the mirror housing 5, but may be located substantially within the mirror housing support 3. Further, the wing mirror unit 1 may be arranged such that the driving element 12 rotates the sensor axis 9 during a limited part of the pivoting movement of the driving element 12 pivoting along with the mirror housing 5 between the folded-in position and the folded-out position and/or between the folded-out position and the folded-in position.

In embodiments, the sensor driving element 12 can substantially extend at least partly around the rotation axis 6 of the wing mirror unit 1. For example, said driving element 12 may comprise and/or may be formed substantially by a wheel and/or a gear wheel, of which only a portion of its perimeter is provided with gear teeth 13 for cooperation with corresponding gear teeth 15 provided at the sensor axis 9 or at a driven element 14 coupled with said sensor axis 9.

As noted, in embodiments, the sensor axis 9 can be coupled to and/or provided with a driven element 14 for cooperation with the sensor driving element 12. For example, said driven element 14 can comprise and/or can be formed by a specially arranged gear wheel or so-called cogwheel. Additionally or alternatively, said driving element 12 and said driven element 14 can be provided with corresponding gear teeth 13, 15, such that the driving element 12 can drive the driven element 14 during the limited part of the pivoting movement of the mirror housing 5 between the folded-in position and the folded-out position and/or during the limited part of the pivoting movement of the mirror housing 5 between the folded-out position and the folded-in position. Advantageously, the gear teeth 13, 15 can be involute gear teeth or so-called evolvent gear teeth. However, the gear teeth can be of different design. For instance, the gear design can be of an epicycloid or Novikov-Wildhaber type.

Additionally, the driven element 14 can comprise a blocking part 16 for cooperation with a corresponding locking part 17 of the driving element 12, said blocking part 16 and said locking part 17 being of such design that the driving element 12 can lock the driven element 14 during a part of the pivoting movement of the mirror housing 5 between the folded-in position and the folded-out position and/or vice versa. It is noted that in this context locking should be understood at least such as that the driven element 14 cannot substantially rotate with respect of a central axis of the sensor axis 9 when being locked. In embodiments, the driven element 14 may for instance thus be able to move along its central axis when being locked. In order to enable that the locking part 17 of the driving element 12 can lock rotation of the driven element 14, the blocking part 16 and the locking part 17 may for instance comprise one or more corresponding guiding surfaces 16a, 17a such that a portion of the guiding surface 17a of the locking part 17 of the driving element 12 can be guided and/or can move along the guiding surface 16a of the blocking part 16 of the driven element 14, thereby counteracting rotation of the driven element 14 about a central axis of the sensor axis 9. It is noted that said guiding surfaces 16a, 17a can preferably be round guiding surfaces or so-called circular guiding surfaces, e.g. surfaces substantially defined by a part of a circular cylinder surface.

Advantageously, the driven element 14 can comprise at least one tooth 15l which protrudes further outwardly than the other teeth 15 of the driven element. This can for instance be seen in FIG. 2 which shows a schematic perspective view of an exemplary embodiment of a rotation sensor 8 with a sensor axis 9 coupled to and/or provided with a driven element 14 according to an aspect of the invention. The so-called top land 151' of said tooth **15*l* protruding relatively far can form the guiding surface 16*a* of the locking part 16*a* of the driven element 14. Preferably, said top land 151' can form a substantially circular guiding surface 16*a*, and can preferably be substantially concave. Additionally or alternatively, the tooth 15*l* defining the guiding surface 16*a* of the locking part 16 of the driven element 14 has a relatively large circular thickness or a relatively large pitch 20, e.g. circular pitch, with respect to the circular thickness or the pitch 21 of the other teeth, which can have a relatively small pitch 21**.

In embodiments, the pitch 20 of the outwardly protruding tooth **15*l* can extend for instance over about 30° to about 120° of the perimeter of the driven element 14, preferably over about 40° to about 90°, such as over about 50° to about 70°, for instance over about 60°. Additionally or alternatively, the other ones 15*a*-15*k* of the teeth 15, i.e. the so-called normal gear teeth 15*a*-15*k*, can extend over about 240° to about 330° of the perimeter of the driven element 14, preferably over about 270° to about 320°, such as over about 290° to about 310°, for instance over about 300°. Additionally or alternatively, said so-called normal gear teeth 15*a*-15*k* of the driven element and/or tooth faces 15", 15'" of the teeth 15*a*-15*l* of the driven element 14 for contacting or meshing with tooth faces 13", 13'" of the driving element 12 (including the tooth faces 15*l"*, 15*l'"* of the outwardly protruding tooth 15*l*) can be positioned along a relatively large part of a perimeter, e.g. an outer perimeter, of the driven element 14. For example, said relatively large part may extend over between 50% and 90% of the perimeter, more preferably over at least 75%, at least 80%, or at least 85% of the perimeter, such as for instance along about ⅚ of the perimeter. As a result, a relatively large part of the range (e.g. between about 250° and about 350°, such as about 300°) in which the rotation sensor 8, e.g. a standard potentiometer 8, works can be utilized, because a relatively large rotation of the driven element 14** may be utilized.

In preferred embodiments, the number of teeth 13 of the driving element 12 can be equal to the number of teeth 15 of the driven element 14, wherein said number of teeth 15 of the driven element 14 includes the tooth **15*l* defining the guiding surface 16*a*. The number of teeth 13 of the sensor driving element 12 can thus be one larger than the number of the so-called normal teeth 15*a*-15*k*** of the driven element.

Additionally or alternatively, the driving element 12 may comprise a second guiding surface **17*b*, which can be provided beyond a last one 13*l* of the teeth 13 of the driving element 12. This can facilitate that the driving element 12 can pivot beyond the point where the last tooth 13*l* of the driving element 12 is meshing with the last normal tooth 15*k* of the driven element 14. As a result, it can for instance be facilitated in a relatively elegant manner that the wing mirror unit 1 can be provided with an over-fold mechanism or so-called fold-over mechanism for enabling that the mirror housing 5 can be folded-over, e.g. in case of a pedestrian or biker hitting the mirror housing 5 from behind. For example, the second guiding surface 17*b* of the driving element 12 and the first guiding surface 17*a* of the driving element 12 can both be located on a single virtual round cylinder outer surface and/or said first and second guiding surfaces 17*a*, 17*b*. Additionally or alternatively, the second guiding surface 17*b* of the driving element 12 and the first guiding surface 17*a* of the driving element 12 can be integrated into a single guiding surface extending substantially from the last tooth 13*l* of the driving element to the first tooth 13*a* of the driving element 12, e.g. said single guiding surface may extend from a recess 22*b* provided substantially directly behind the last tooth 13*l* up to a recess 22*a* substantially directly in front of the first tooth 13*a***.

It is noted that the teeth **13*a*-13*l* of the driving element 12 can be positioned along a relatively small part of a perimeter, e.g. a relatively small part of an outer perimeter, such as a periphery of the driving element 12, preferably along between 1/24 and 1/6 of the perimeter, more preferably along between 1/18 and 1/12, such as for instance along about 1/14 or about 1/15 of the perimeter. As another example, the teeth 13 of the driving element 12 for meshing with the teeth 15 of the driven element 14 may in embodiments cover at most 50° or at most 40°, preferably at most about 35°, at most about 30° or at most about 25° of the perimeter of the driving element 12. As a result, it can be facilitated that only in a relatively small part of the perimeter of the driving element 12 the driven element 14 and/or the sensor axis 9 of the rotation sensor 8 is driven by means of the teeth 13 of the driving element 12 cooperating teeth 15 of the driven element 14. Advantageously, the wing mirror unit 1** can be arranged such that said relatively small part corresponds with the range in which a folded-out mirror housing can be fine-tuned, e.g. it can correspond with a route between a minimum folded-out position and a maximum folded-out position.

A preferred use of a wing mirror unit 1 according to the invention will now be elucidated by means of the FIGS. **1*a*-1*d*. In FIG. 1*a*, the unit 1 is shown in a folded-in position of the mirror housing 5. For example, the wing mirror unit 1 can have only one folded-in position, e.g. defined by means of cooperating stop surfaces. The mirror housing 5 can for instance be in the folded-in position while the vehicle is parked. When the motor vehicle 2 is to be prepared for use or departure, the wing mirror housing 5 can be folded-out to a folded-out position. For example, a drive, e.g. an electric drive, can pivot the mirror housing around a rotation axis 6 of the unit 1, e.g. by pivoting the driving element 12 around said axis 6. As can be seen in FIG. 1*b*, which shows the wing mirror housing 5 being in a position between the folded-in position of FIG. 1*a* and a folded-out position when being moved from said folded-in position to a folded-out position, a guiding surface 17*a* of the blocking part 17 of the driving element 12 can then move along a corresponding guiding surface 16*a* of the locking part 16 of the driven element 14. This can be done in a manner in which the driven element 14 is not driven by the driving element 12. Actually, the guiding surfaces 16*a*, 17*a* may prevent that the driven element 14 is pivoted around the sensor axis 9 then. This is, said guiding surfaces 16*a*, 17*a* can keep the driven element 14** substantially stationary then.

Figure 3A:
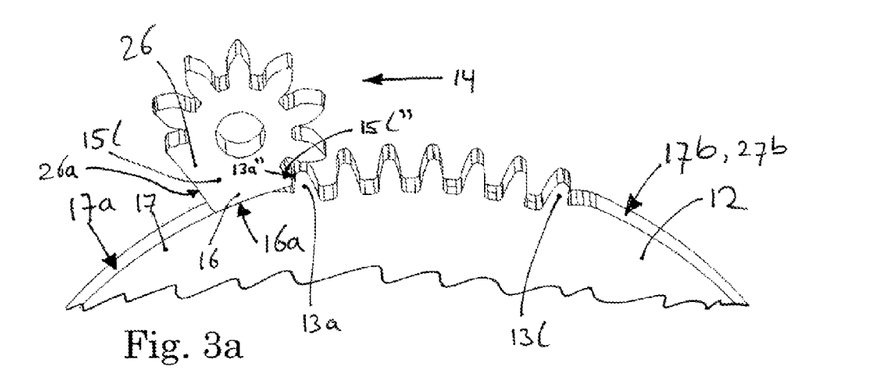
FIG. 3a shows a schematic partly cutaway perspective view of an alternative driving element and corresponding driven element for an alternative embodiment of a rotation sensor according to an aspect of the invention in a first position.

In the process of pivoting the mirror housing 5, during which process the driving element 12 can pivot along with said mirror housing 5, a first tooth **13*a* of the driving element 12 can reach the driven element 14, as for instance can be seen in FIG. 3*a* which shows an alternative embodiment of a driving element 12 and an alternative embodiment of a driven element 14. Then, a first tooth face 15*l"* of the outwardly protruding tooth 15*l* of the driven element 14 may abut a first tooth face 13*a"* of the first tooth 13*a* of the driving element 12. It is noted that in embodiments, the teeth 13 of the driving element 12, or at least the first tooth 13*a*, may, for instance therefore, protrude further outwardly than the one or more guiding surfaces 17*a*, 17*b***.

Further, it is noted that, additionally or alternatively, as for instance can be seen in the exemplary embodiments of FIGS. 1a-1d, a recess 22a provided before the first tooth 13a and/or a recess 22b provided behind the last tooth 13l of the driving element 12 can be relatively large, e.g. relatively wide and/or relatively deep, in order to provide enough space for the relatively large tooth 15l of the driven element 14. From the moment that the first tooth face 15l" of the outwardly protruding tooth 15l of the driven element 14 meshes with the first tooth face 13a" of the first tooth 13a of the driving element 12, see e.g. FIG. 3a, the driven element 14 is driven by the driving element 12. It can then thus be known that the mirror housing 5 has reached its minimum folded-out position, see e.g. FIG. 3a which shows an position of the driven element 14 and the driving element 12 in a position corresponding to a minimum folded-out position of the mirror housing 5, and from then on, the sensor axis 9 can thus rotate when the mirror housing 5 is pivoted further towards it maximum folded-out position, and the sensor 8 can then thus provide data regarding further rotation of the driving element 12, and therefore regarding further rotation of the mirror housing 5 holding the mirror glass 10.

In embodiments, the wing mirror unit 1 may be arranged such that at the moment that the driven element 14 is first rotated by the driving element 12 corresponds to a minimum folded-out position of the wing mirror housing 5. For example, the route along which the housing 5 can be pivoted between its folded-in position and said minimum folded-out position can for example correspond with a rotation in a range between about 25° and about 75°, for example in a range between about 35° and about 50°, such as for instance about 37° or about 48°. Additionally or alternatively, the route along which the housing 5 can be pivoted between its minimum folded-out position and its maximum folded-out position can for example correspond with a rotation in a range between about 15° and about 50°, for example in a range between about 20° and about 30° or 35° or 40°, such as for instance about 25°, about 30°, or about 35°.

As can be seen when comparing FIGS. 1c and 1d, which both show the mirror housing 5 in a respective folded-out position, the driven element 14 can be pivoted relatively far (e.g. over an angle of about 80°) while the mirror housing 5 is only pivoted over a relatively small angle (e.g. over about 8°) when pivoting from one folded-out position (e.g. position in FIG. 1c) to another folded-out position (e.g. position in FIG. 1d).

In embodiments, data provided by the rotation sensor 8 can be used to control the drive for moving the mirror housing 5, e.g. from the folded-in position or from a first folded-out position towards a certain folded-out position. For example, the mirror housing 5 may be folded-out to a medium folded-out position, such as for instance shown in FIG. 1d. Alternatively or additionally, the wing mirror unit 1 or a system (not shown) for controlling the wing mirror unit 1 may be provided with a memory (not shown) for storing one or more predetermined rotation settings, e.g. settings corresponding to a certain user of the motor vehicle and/or corresponding to certain adjustments of a driver seat and/or driving controls such as a steering wheel. For example in such a case, the wing mirror unit 1 or said system may control the drive for driving the mirror housing and may stop the mirror housing in the predetermined folded-out position based at least partly on feedback provided by the rotation sensor 8.

The rotation sensor 8 may thus provide feedback usable for controlling the drive for pivoting the mirror housing 5. Said information may for instance be used when fine-tuning the mirror housing 5, i.e. moving the mirror housing 5 from one folded-out position to another folded-out position.

As mentioned above, the driving element 12 may comprise a second guiding surface 17b for cooperation with the circular guiding surface 16a provided by the relatively far outwardly extending tooth 15l of the driven element 14. Said second guiding surface 17b can be provided beyond a last one 13l of the teeth 13 of the driving element 12, e.g. to facilitate that the mirror housing 5 can be folded-over without allowing further rotation of the driven element 14 and thus without allowing further rotating the sensor axis 9. However, although such an arrangement, which is relatively simple and robust of design, can be highly advantageous over the prior art, it cannot be deduced from the rotational position of the driven element 14 and/or the rotational position of a sensor axis 9 coupled thereto, whether the mirror housing 5 is positioned in a folded-in position or position between the folded-in position and a minimum folded-out position, or whether the mirror housing 5 is positioned in a folded-over position, e.g. a position beyond a maximum folded-out position.

For example when it is not stored in a memory whether the mirror housing 5 is positioned in a folded-in position or a position between the folded-in position and a minimum folded-out position, or whether the mirror housing 5 is positioned in a folded-over position, it may be desirable to allow the mirror unit 1 to detect the position of the mirror housing 5 in order to know in which direction the mirror housing 5 is to be rotated to bring it directly towards a folded-out position, e.g. without risking that the mirror housing 5 rotates in the wrong direction firstly and has to be rotated in the right direction afterwards, e.g. after a stop surface of the mirror housing 5 has abutted against a corresponding stop surface which for instance can be provided at the mirror housing support 3.

Thereto, the driven element 14 can be provided with a second blocking part 26 for cooperation with a corresponding second locking part 27 of the driving element 12, wherein said second blocking part 26 and said second locking part 27 being of such design that the driving element 12 locks the driven element 14 against rotation during a part of the pivoting movement of the mirror housing 5 between the folded-out position and a fold-over position and/or vice versa.

For example, the second blocking part 26 and the second locking part 27 can comprise corresponding second circular guiding surfaces 26a, 27b, such that a portion of the second circular guiding surface 27b of the second locking part 27 of the driving element 12 can be guided along the second circular guiding surface 26a of the second blocking part of the driven element 14, thereby counteracting rotation of the driven element 14 about a central axis of the sensor axis 9.

When the first guiding surface 16a of the driven element 14 slides over the corresponding first guiding surface 17a of the driving element 12, the driven element 14 can be in another rotational position than when the second guiding surface 26a of the driven element 14 slides over the corresponding second guiding surface 17b, 27a of the driving element 12. As a result, it may be deducible from the rotational position of the driven element 14 and/or the rotational position of a sensor axis 9 coupled thereto, whether the mirror housing 5 is positioned in a folded-in position or position between the folded-in position and a minimum folded-out position (see e.g. FIGS. 3a and 4b), or whether the mirror housing 5 is positioned in a folded-over position, e.g. a position beyond a maximum folded-out position, e.g. when the second guiding surface 26a of the driven element 14 is substantially parallel with the corresponding second guiding surface 17b, 27a of the driving element 12.

Figure 3B:
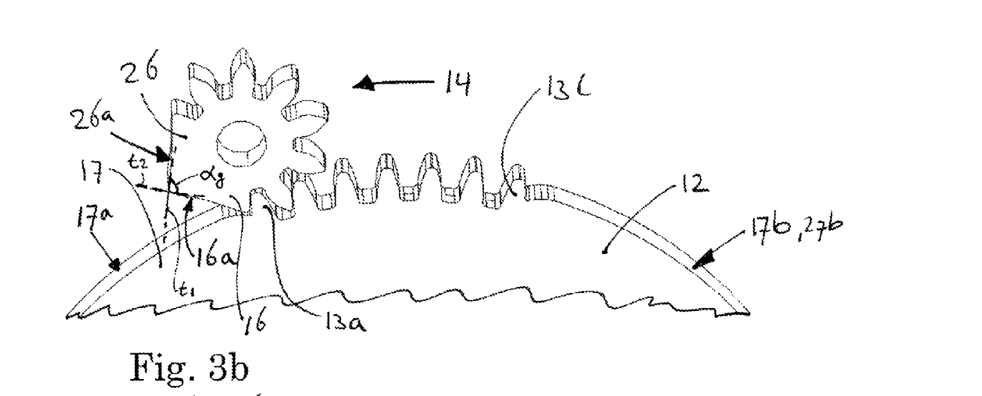
FIG. 3b shows the driving element and corresponding driven element of FIG. 3a in a second position.
Figure 3C:
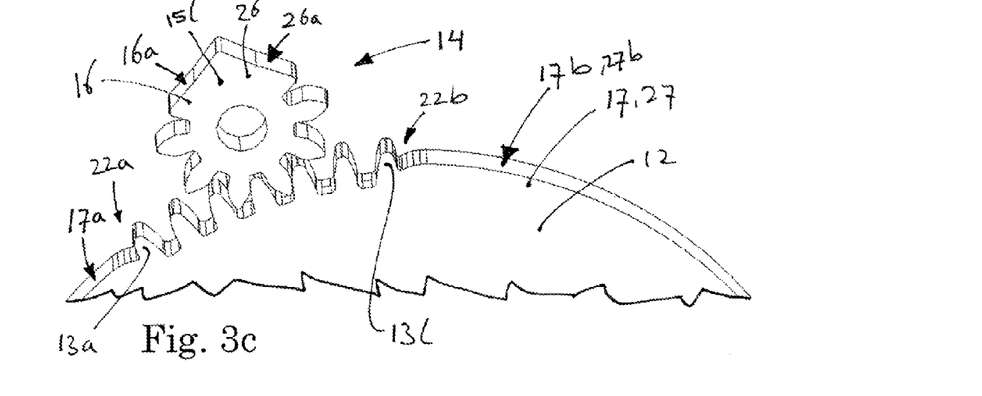
FIG. 3c shows the driving element and corresponding driven element of FIGS. 3a and 3b in a third position.

In advantageous embodiments, such as for instance can be understood from FIGS. 3a-3c, which show exemplary embodiments of a driving element 12 and a corresponding driven element 14 in different rotational positions of the driving element 12, the first circular guiding surface 16a and the second circular guiding surface 26a may each be located on different virtual round cylinder outer surfaces, preferably wherein an angle $\alpha_g$ between the tangent line $t_1$ to the first virtual round cylinder outer surface and the tangent line $t_2$ to the second virtual round cylinder outer surface is smaller than 180°, preferably smaller than 170°, 160°, 150°, or even 140°, at a location where said virtual cylinder outer surfaces intersect.

Advantageously, the second circular guiding surface 26a can be located at another height level than the height level of the first circular guiding surface 16a, e.g. seen in a direction along the rotation axis 6 of the mirror housing 5. By locating both guiding surfaces 16a, 26a at different height levels, the guiding surfaces 16a, 26a can at the one hand be relatively wide, e.g. seen substantially along the periphery of the driven element 14, while at the other hand relatively much space can be provided along the periphery of the driven element 14 to accommodate the teeth 15 for cooperation with the teeth 13 of the driving element 12. It is noted that, such as can be seen in FIGS. 4a and 4b, seen in the rotational direction of the driven element 14, the first circular guiding surface 16a and the second circular guiding surface 26a of the driven element 14 can overlap at least partly.

In such cases, the first and second guiding surfaces 17a, 17b of the driving element 12 can be located at different height levels. Preferably, the first guiding surface 17a of the driving element 12 can be located substantially at the same height level as the first guiding surface 16a of the driven element 14, while the second guiding surface 17b, 27b of the driving element 12 can be located substantially at the same height level as the second guiding surface 26a of the driven element 14.

Figure 4A:
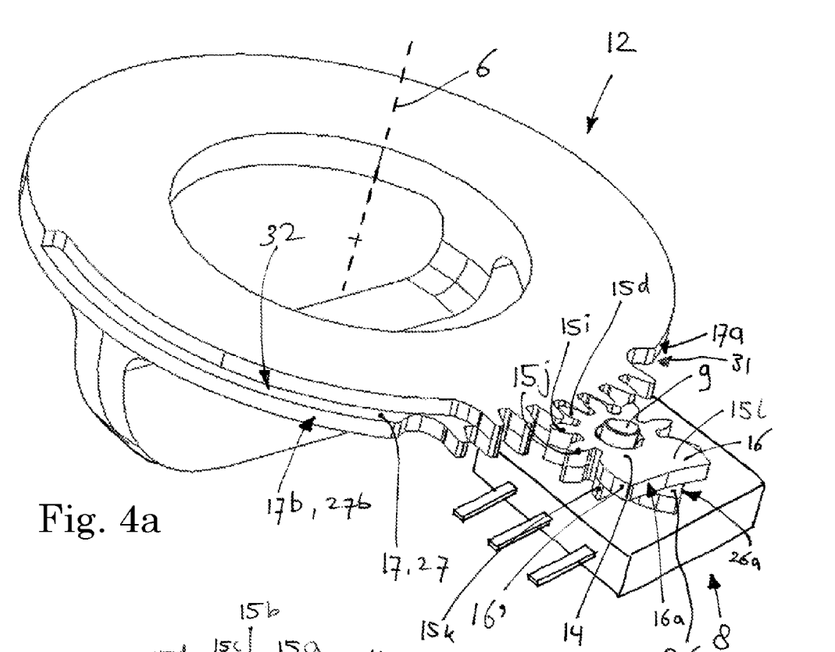
FIG. 4a shows a schematic perspective view of a further alternative exemplary embodiment of a rotation sensor according to an aspect of the invention and a driving element for driving a driven element of said rotation sensor.
Figure 4B:
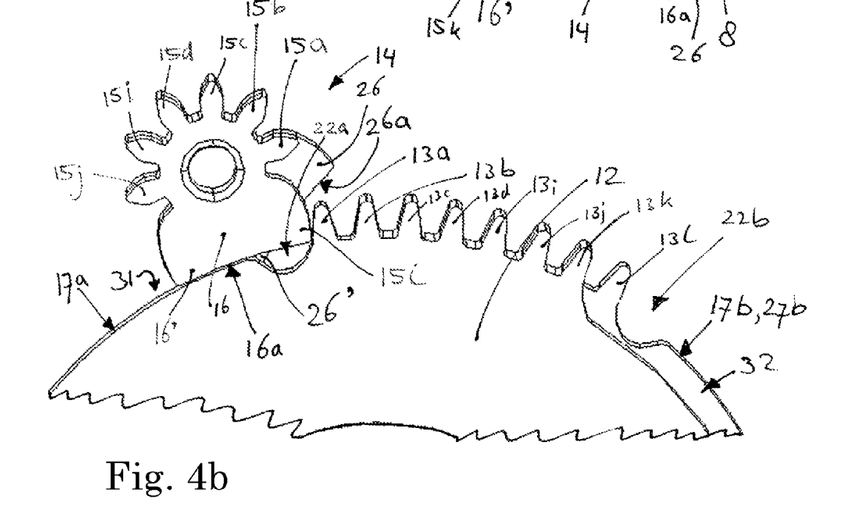
FIG. 4b shows a schematic partly cutaway perspective view of the driving element and the corresponding driven element of the rotation sensor of FIG. 4a in another position.

As can be seen in FIGS. 4a and 4b, at the rotational position of the first guiding surface 17a of the driving element 14, the driving element 14 can be provided with a first recess 31 located at the height level of the second guiding surface 26a of the driven element 14, wherein said first recess 31 can accommodate a part 26' of the second locking part 26 such as to counteract that the second locking part 26 prevents the driven element 14 from rotating to such extent that the first guiding surface 16a of the driven element 14 will become substantially parallel with the first guiding surface 17a of the driving element 12. Further, at the rotational position of the second guiding surface 17b, 27b of the driving element 14, the driving element 14 can be provided with a second recess 32 located at the height level of the first guiding surface 16a of the driven element 14, wherein said second recess 32 can accommodate a part 16' of the first locking part 16 such as to counteract that the first locking part 16 will prevent the driven element 14 from rotating to such extent that the second guiding surface 26a of the driven element 14 will become substantially parallel with the second guiding surface 17b, 27b of the driving element 12.

It is noted that said first recess 31 may extend to such extent that it also covers a space behind, or in front of, at least a first one 13a of the teeth 13a-13l of the driving element 12 and that the second recess may extend to such extent that it also covers the space in front of, or behind, at least last one 13l of the teeth 13a-13l of the driving element 12, as can be seen in the exemplary embodiment of FIGS. 4a and 4b. The invention also relates to a drive construction 12, 14 for driving a sensor axis 9 of a rotation sensor 8, preferably a potentiometer, of a wing mirror unit 1 as disclosed herein. Said drive construction 12, 14 comprises a driving element 12 for a wing mirror unit 1 and a corresponding driven element 14 which can be provided on said sensor axis 9.

Figure 2:
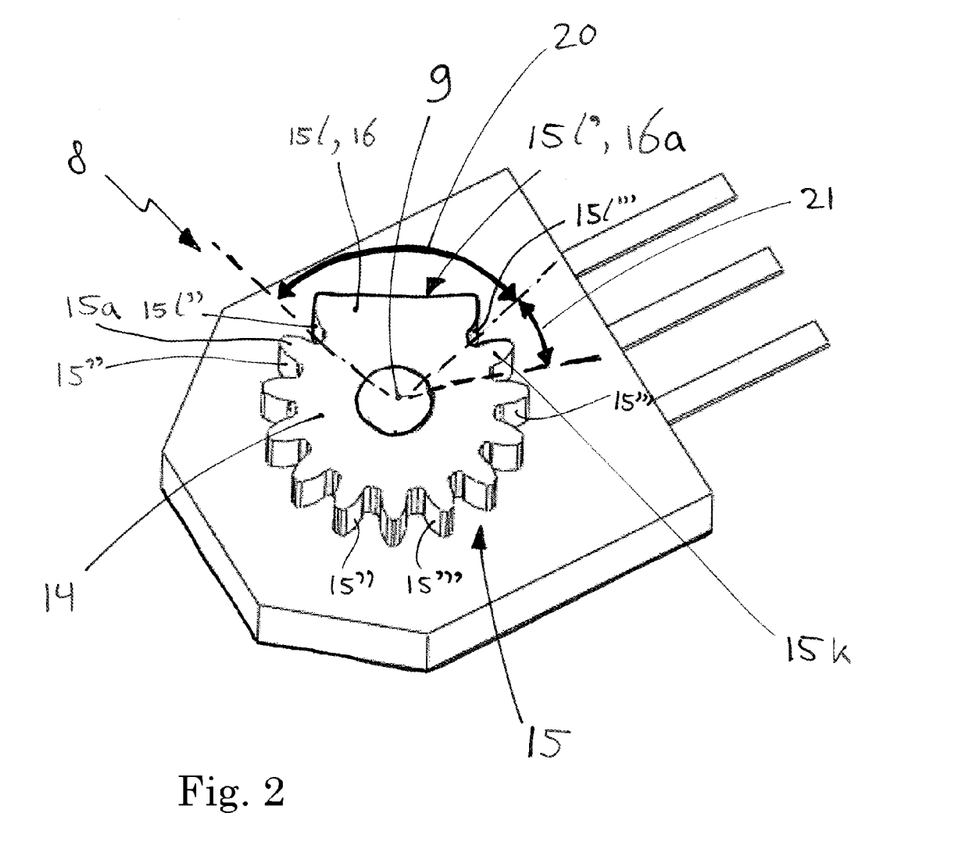
FIG. 2 shows a schematic perspective view of an exemplary embodiment of a rotation sensor according to an aspect of the invention.

Furthermore, the invention relates to a rotation sensor 8, of which an exemplary embodiment is shown in FIG. 2. Said sensor 8 according to an aspect of the invention comprises a rotation axis 8 coupled to and/or provided with a driven element 14 having a perimeter provided with a plurality of gear teeth 15 or so-called cocks 15 and a locking part 16 having a circular guiding surface 16a for cooperation with a circular guiding surface 17a of a blocking part 17 of a corresponding driving element 12 of a wing mirror unit 1, wherein said driving element 12 is arranged for driving said driven element 14, during a part of a pivoting movement of said driving element 12.

It is noted that for the purpose of clarity and a concise description features are described herein as part of the same or separate embodiments, however, it will be appreciated that the scope of the invention may include embodiments having combinations of all or some of the features described.

Further, it is noted that the invention is not restricted to the embodiments described herein. It will be understood that many variants are possible.

For example, the mirror glass 10 may for instance be held by the mirror housing 5, e.g. by means of a mirror glass holder, in a manner in which the mirror glass 10 is substantially fixed with respect to said housing 5. However, in alternatively embodiments, the mirror glass may be movable with respect to the mirror housing 5 to some extent, e.g. in order to move around a substantially horizontal axis, preferably extending substantially parallel with the mirror glass, such that the mirror glass can be fine-tuned to face at least a little bit more upwards or at least a little bit more downwards.

As another example, it is noted that although the driven element 14 cooperates with an outside perimeter of the driving element 12 in the exemplary embodiment shown in the figures, the driven element 14 may in alternative embodiments cooperate with an inside perimeter 23 of the driving element 12, which then may be provided with teeth 13 or so-called cocks 13 and one or more suitable guiding surfaces 17a. In such case, the guiding surface 16a of the locking part 16 of driven element 14 can for instance be convex, whereas the corresponding guiding surface 17a of the blocking part 17 of the driving element 12 can then be concave.

Such and other variants will be apparent for the person skilled in the art and are considered to lie within in the scope of the invention as formulated in the following claims.

The invention claimed is:

1. A wing mirror unit for a motor vehicle, comprising:
   a mirror housing support for attachment to a body of the motor vehicle;
   a mirror housing supported by the mirror housing support and pivotably arranged with respect to said support around a rotation axis extending substantially in an upward direction; and
   a drive for pivoting the mirror housing between a folded-out position of the mirror housing, in which the mirror housing extends substantially in a direction away from the body of the motor vehicle, and a folded-in position of the mirror housing, in which the mirror housing projects less far and extends in a substantially rearward direction more alongside the body of the motor vehicle, and/or for pivoting the mirror housing between the folded-in position and the folded-out position, wherein the wing mirror unit further comprises a rotation sensor having a sensor axis, and wherein the wing mirror unit is arranged for rotating the sensor axis during a limited part of the pivoting route between the folded-out position and the folded in position and/or during a limited part of the pivoting route between the folded-in position and the folded-out position.

2. The wing mirror unit according to claim 1, wherein the rotation sensor is at least rotationally fixed at or in the mirror housing with respect to the rotation axis such as to pivot along with the mirror housing around the rotation axis of the wing mirror unit between the folded-in position and the folded out position of the mirror housing and/or between the folded-out position and the folded in position, the wing mirror unit further comprising a sensor driving element for driving the sensor axis, said driving element being at least rotationally fixed at or in the mirror housing support with respect to the rotation axis, and wherein the wing mirror unit is arranged such that the sensor driving element rotates the sensor axis during a limited part of the pivoting movement of the sensor pivoting along with the mirror housing between the folded-in position and the folded-out position and/or between the folded-out position and the folded-in position.

3. The wing mirror unit according to claim 1, wherein the rotation sensor is at least rotationally fixed at or in the mirror housing support with respect to the rotation axis, wherein the wing mirror unit comprises a sensor driving element for driving the sensor axis, said driving element pivoting along with the mirror housing between the folded in position and the folded out position of the mirror housing and/or vice versa, and wherein the wing mirror unit is arranged such that the driving element rotates the sensor axis during a limited part of the pivoting movement of the driving element pivoting along with the mirror housing between the folded-in position and the folded-out position and/or between the folded-out position and the folded-in position.

4. The wing mirror unit according to claim 2, wherein the sensor axis is coupled to and/or provided with a driven element for cooperation with the driving element, the driving element and the driven element being provided with corresponding gear teeth, such that the driving element drives the driven element during the limited part of the pivoting movement of the mirror housing between the folded-in position and the folded-out position and/or during the limited part of the pivoting movement of the mirror housing between the folded-out position and the folded-in position.

5. The wing mirror unit according to claim 4, wherein the gear teeth are involute gear teeth.

6. The wing mirror unit according to claim 4,
wherein the driven element comprises a blocking part for cooperation with a corresponding locking part of the driving element, said blocking part and said locking part being configured such that the driving element locks the driven element against rotation during a part of the pivoting movement of the mirror housing between the folded-in position and the folded-out position and/or vice versa.

7. The wing mirror unit according to claim 6,
wherein the driven element comprises a second blocking part for cooperation with a corresponding second locking part of the driving element, said second blocking part and said second locking part being configured such that the driving element locks the driven element against rotation during a part of the pivoting movement of the mirror housing between the folded-out position and a fold-over position and/or vice versa.

8. The wing mirror unit according to claim 7, wherein the driven element comprises at least one tooth protruding further outwardly than the other teeth of the driven element, wherein a top land of said tooth protruding relatively far forms:
the first circular guiding surface of the first locking part of the driven element; and/or
the second circular guiding surface of the second locking part of the driven element.

9. The wing mirror unit according to claim 8, wherein the tooth defining the first circular guiding surface of the first locking part of the driven element and/or defining the second circular guiding surface of the second locking part of the driven element has a relatively large circular thickness or relatively large pitch with respect to a circular thickness or pitch of the other teeth of the driven element.

10. The wing mirror unit according to claim 4, wherein the number of teeth of the driving element is equal to the number of teeth of the driven element, a guiding surface of the driving element extending substantially from the last tooth of the driving element to the first tooth of the driving element.

11. The wing mirror unit according to claim 4, wherein the teeth of the driving element are positioned along an outer perimeter of the driving element along between about $\frac{1}{24}$ and about $\frac{1}{6}$ of the perimeter.

12. The wing mirror unit according to claim 4, wherein tooth faces of the teeth of the driven element are positioned along an outer perimeter of the driven element, along between about $\frac{1}{2}$ and about $\frac{9}{10}$ of the perimeter.

13. The wing mirror unit according to claim 1, wherein the rotation sensor provides feedback used for controlling the drive for pivoting the mirror housing.

14. A sensor driving unit for driving a sensor axis of a rotation sensor of a wing mirror unit according to claim 2, the sensor driving unit comprising a sensor driving element for a wing mirror unit according to claim 2 and a corresponding driven element for a wing mirror unit, wherein the sensor axis is coupled to and/or provided with a driven element for cooperation with the driving element, the driving element and the driven element being provided with corresponding gear teeth, such that the driving element drives the driven element during the limited part of the pivoting movement of the mirror housing between the folded-in position and the folded-out position and/or during the limited part of the pivoting movement of the mirror housing between the folded-out position and the folded-in position.

15. A rotation sensor for a wing mirror unit according to claim 1, comprising a rotation axis coupled to and/or provided with a driven element having a perimeter provided with a plurality of gear teeth and at least one locking part having a circular guiding surface for cooperation with a circular guiding surface of a blocking part of a driving element of the wing mirror unit, wherein said driving element is for driving said driven element during a part of a pivoting movement of said driving element.

16. The wing mirror unit of claim 1, wherein the drive is an electric drive and the rotation sensor is a potentiometer.

17. The wing mirror unit of claim 7, wherein the blocking part and the locking part comprise corresponding circular guiding surfaces, such that a portion of the circular guiding surface of the locking part of the driving element can be guided along the circular guiding surface of the blocking part of the driven element, thereby counteracting rotation of the driven element about a central axis of the sensor axis and wherein the second blocking part and the second locking part comprise corresponding second circular guiding surfaces, such that a portion of the second circular guiding surface of the second locking part of the driving element can be guided along the second circular guiding surface of the second blocking part of the driven element, thereby counteracting rotation of the driven element about a central axis of the sensor axis.

* * * * *